United States Patent [19]

Tilby

[11] 4,386,492

[45] Jun. 7, 1983

[54] SUGARCANE HARVESTING METHODS AND APPARATUS

[75] Inventor: Sydney E. Tilby, Victoria, Canada

[73] Assignee: Intercane Systems, Inc., Windsor, Canada

[21] Appl. No.: 220,833

[22] Filed: Dec. 29, 1980

[51] Int. Cl.³ .............................................. A01D 55/26
[52] U.S. Cl. ........................................ 56/13.9; 56/60; 56/14.3; 56/14.5
[58] Field of Search ...................... 56/14.1, 14.2, 14.3, 56/14.5, 13.6, 13.7, 13.8, 13.9, 56-61

[56] References Cited

U.S. PATENT DOCUMENTS

| | | | |
|---|---|---|---|
| 928,149 | 7/1909 | Peters | 56/13.9 |
| 1,118,636 | 11/1914 | Cockrell, Jr. | 56/13.9 |
| 3,434,271 | 3/1969 | Gaunt et al. | 56/60 |
| 3,583,134 | 6/1971 | Kemper | 56/14.2 |
| 3,673,774 | 7/1972 | Mizzi | 56/60 |
| 3,925,969 | 12/1975 | Shunichi | 56/13.9 |
| 4,291,521 | 9/1981 | Haake | 56/60 |

*Primary Examiner*—Robert A. Hafer
*Attorney, Agent, or Firm*—Burns, Doane, Swecker & Mathis

[57] ABSTRACT

A stalk harvester comprises a mobile frame on which is mounted a deflector for engaging and bending upper portions of standing stalks forwardly. A cutter cuts the bent stalks at their base. A pair of generally rotary stalk feeding members are disposed behind the deflector and are mounted for rotation about generally upright axes. These rotary feeding members form a generally upright nip therebetween for gripping the lower stalk ends and feeding the stalks rearwardly. A drive mechanism rotates the feeding members to feed the lower stalk ends rearwardly while upper ends thereof are acted upon by the deflector to cause the stalks to travel upwardly within the nip as the stalks travel rearwardly, thereby causing the stalks to approach a horizontal orientation. A plurality of additional pairs of stalk feeding rotary members are inclined relative to vertical by progressively increasing amounts toward the rear so as to accelerate the reorientation of the stalks toward a horizontal inclination. Some of those stalk feeding members comprise rotary flails which strip foliage from the stalk. A conveyor advances the defoliated stalks and includes a floor formed by rotary screws which pull residual foliage from the stalks. The ground support for the stalk harvester comprises endless tracks having curved-crossed members to provide lateral stability.

15 Claims, 11 Drawing Figures

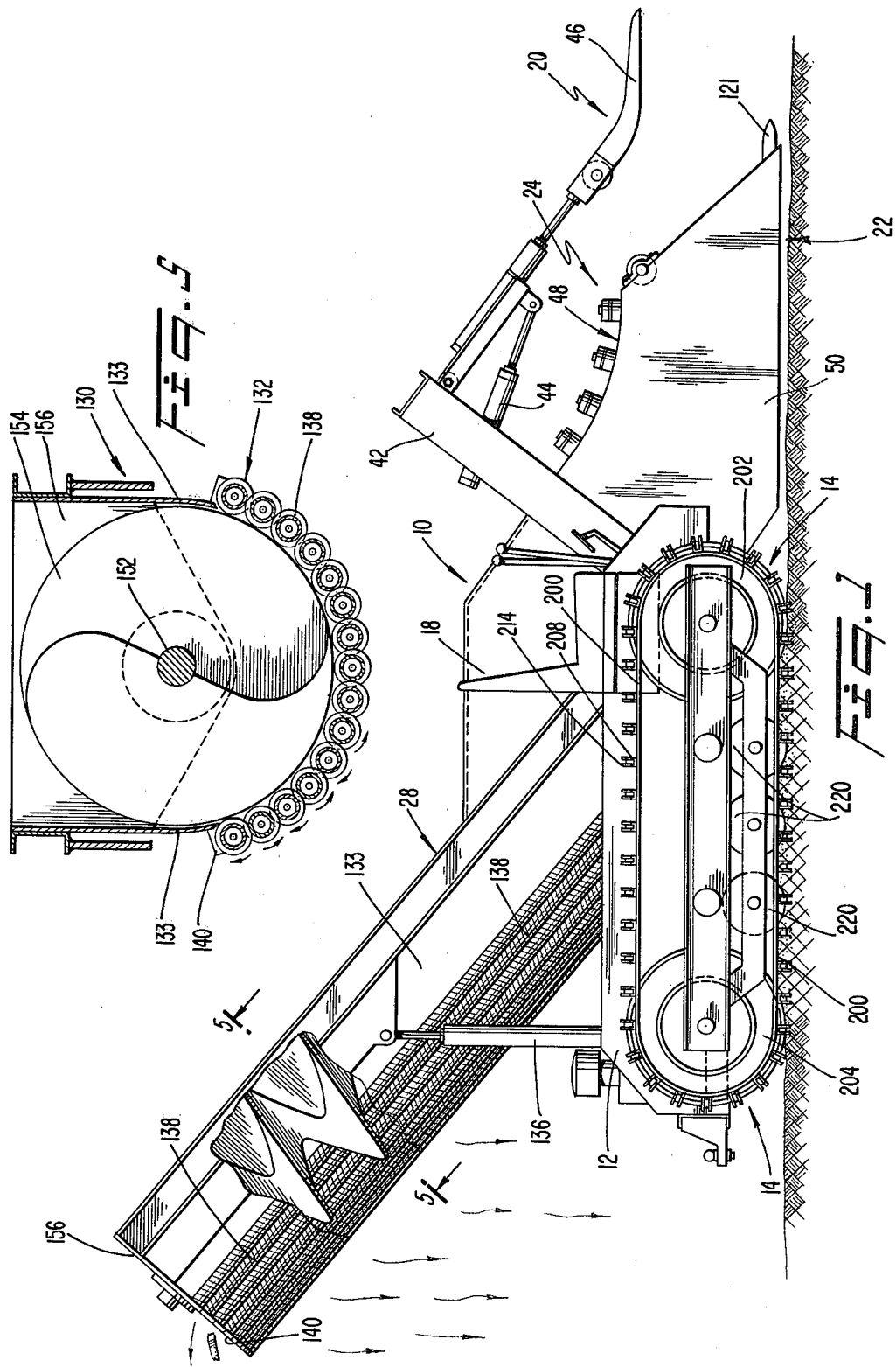

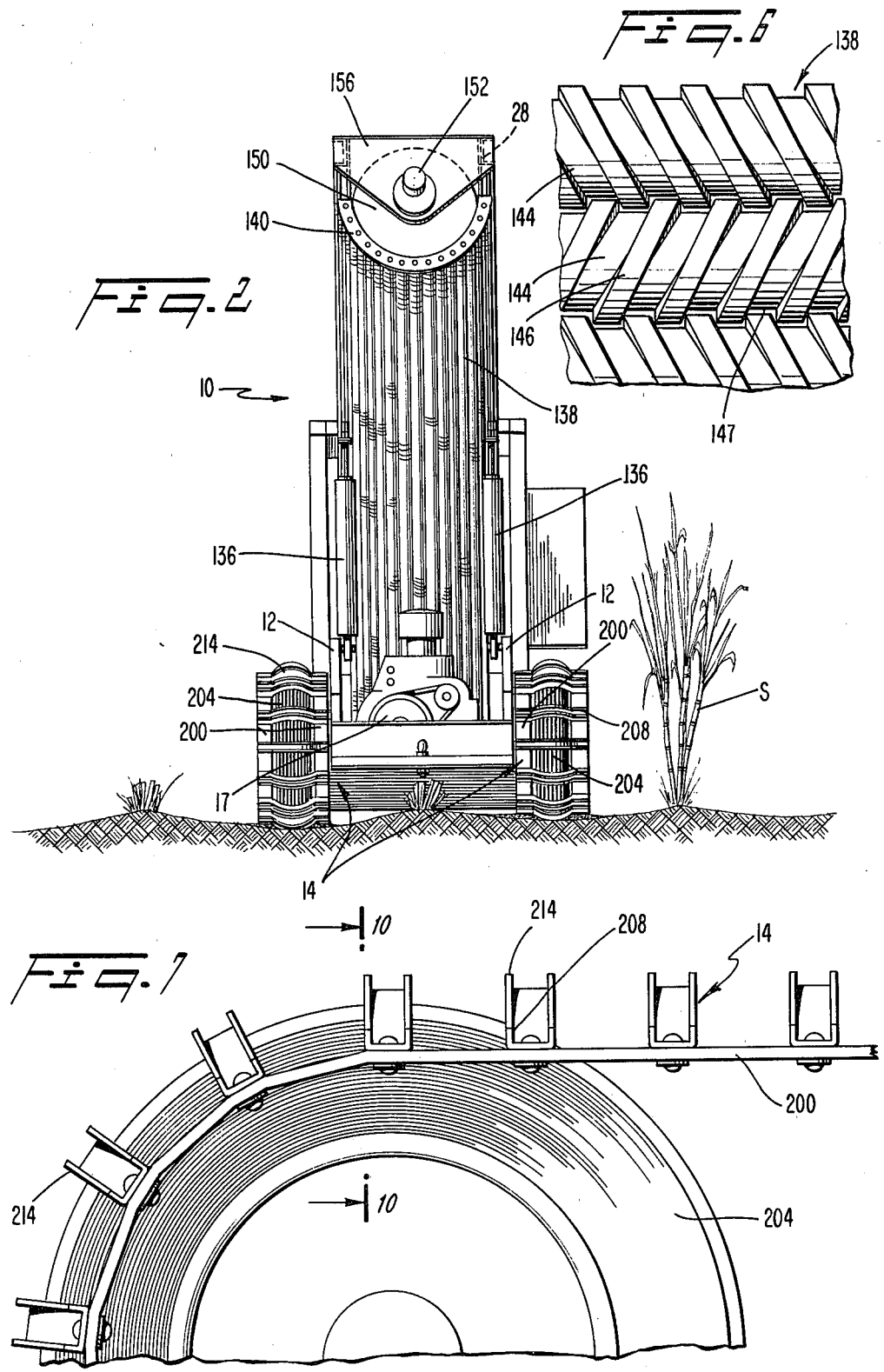

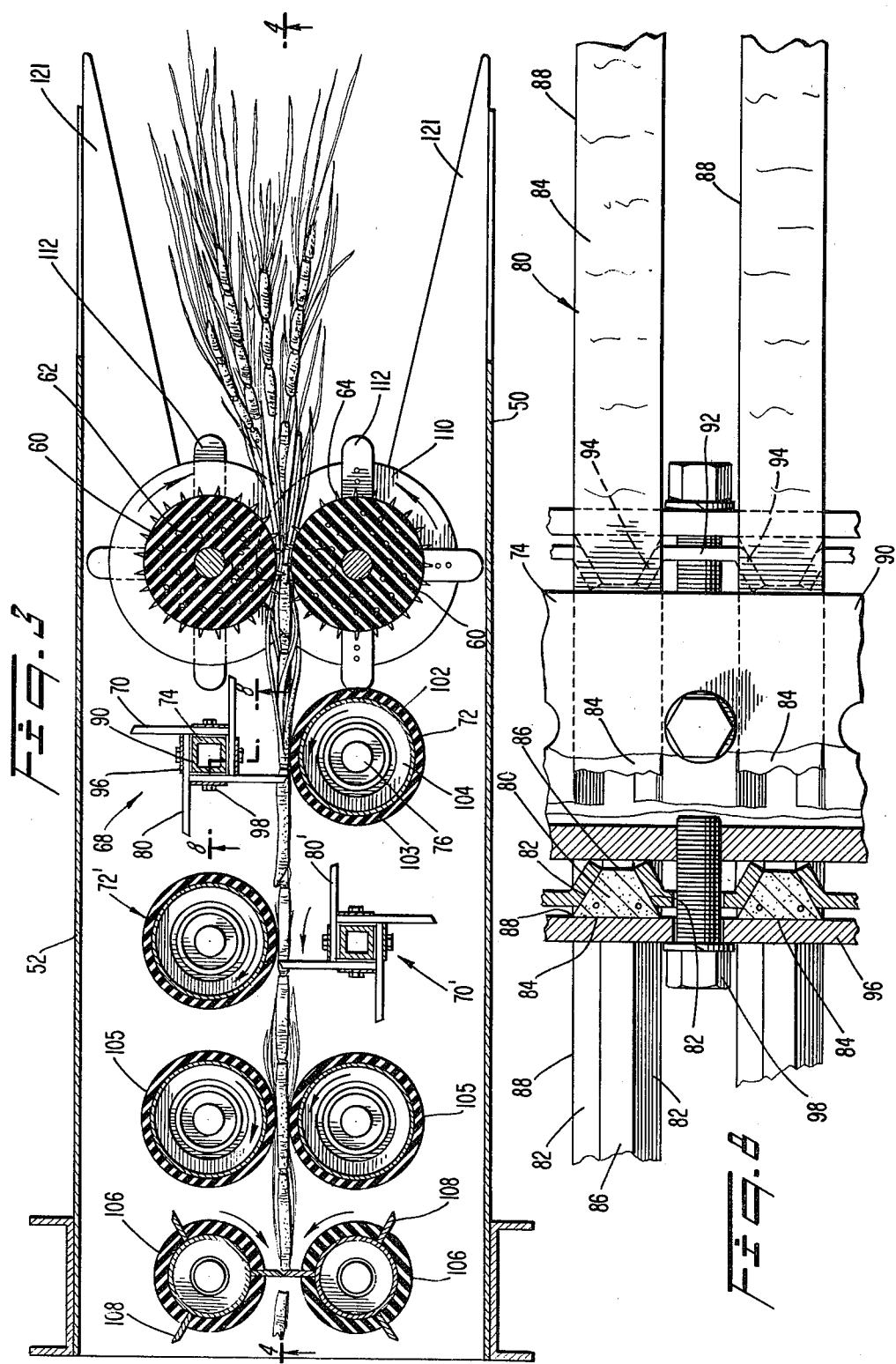

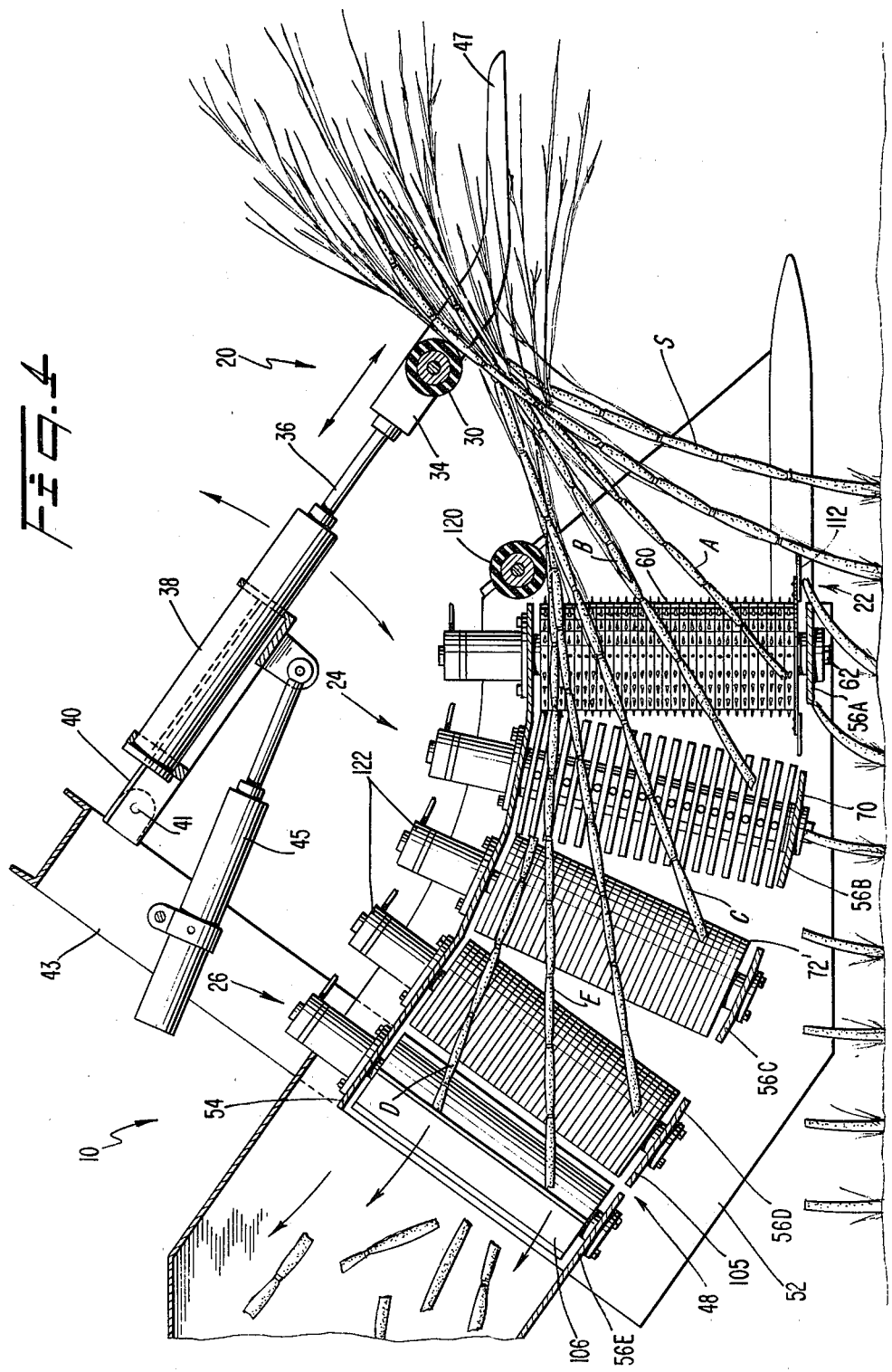

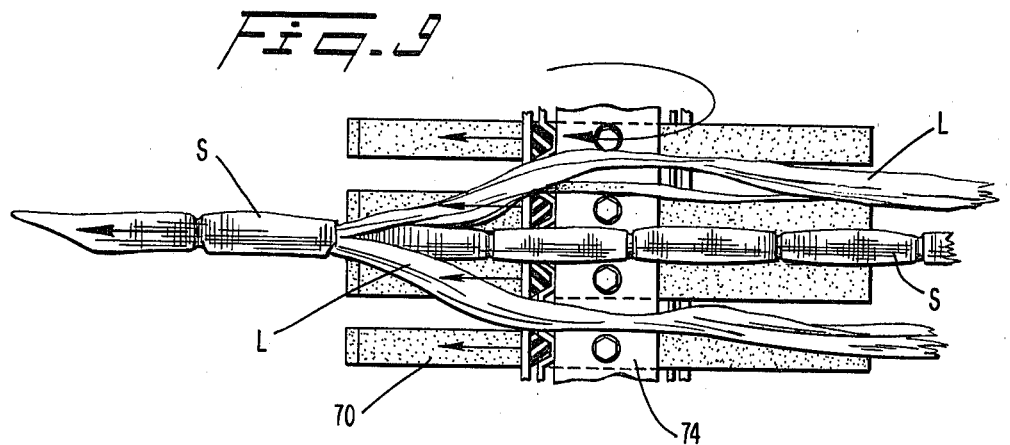
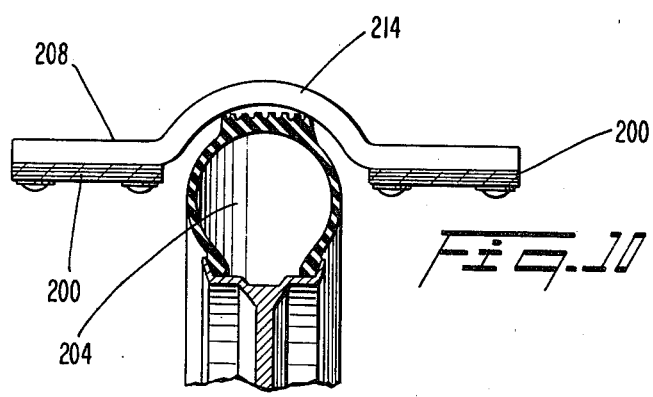
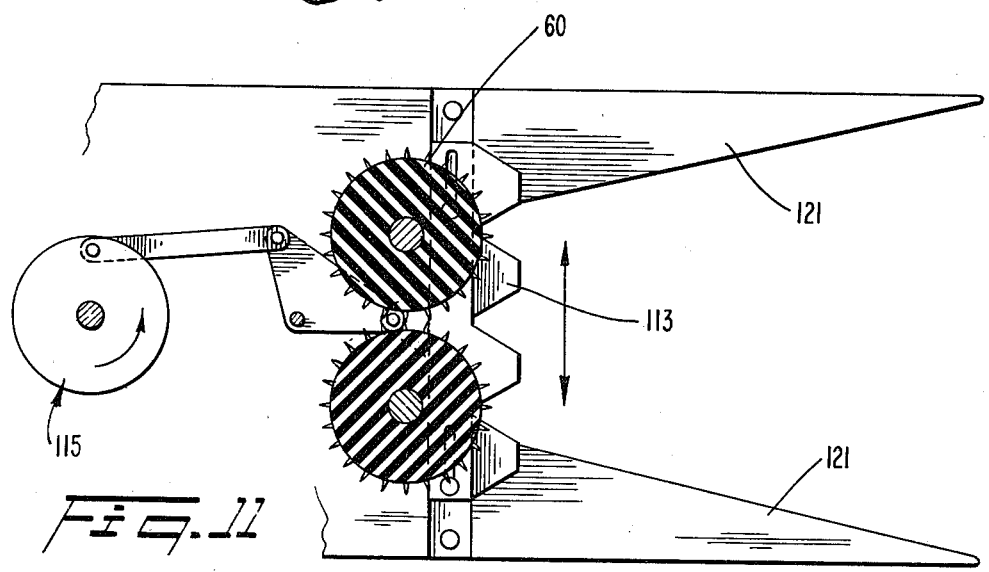

SUGARCANE HARVESTING METHODS AND APPARATUS

BACKGROUND AND OBJECTS OF THE INVENTION

The present invention relates to the harvesting of sugarcane and, in particular, to methods and apparatus for mechanically cutting and defoliating sugarcane stalks in the field.

A common source of sugar is sugarcane stalks which are grown in rows in the field and contain therethroughout an inner pithy material from which sugar juices are extracted. Sugarcane stalks also contain a substantial quantity of leafy foliage on the exterior which must be removed prior to processing of the stalks.

Harvesting of sugarcane stalks has traditionally been accomplished by manual labor. In particular, it has heretofore been the practice to burn the unwanted foliage from the stalks while the stalks are standing in the field, and then chopping the stalks at their base. Such a practice, besides fouling the environment, may end to dry the stalks and reduce the sugar juice yield. Accordingly, mechanical harvesting has been heretofore proposed in which the cane stalks are to be mechanically cut and separated from the foliage absent the burning step, as evidenced by the disclosures of U.S. Pat. No. 928,149 issued to Peters on July 13, 1909, U.S. Pat. No. 1,118,636 issued to Cockrell on Nov. 24, 1914, and U.S. Pat. No. 3,925,969 issued to Shunichi on Dec. 16, 1975. However, the harvesters proposed in those patents have not been commercially successful.

In that regard, it is desirable that a harvester be capable of rapidly traversing a row of stalks while harvesting cane stalks which are inclined or upright, as well as incorporate as few mechanical components as possible. In one previous proposal (e.g., see the above referenced Shunichi patent), a harvester is to cut the stalks at their base, and engage the cut stalks with horizontal feed rollers disposed at a distance behind the cutters, which rollers feed the stalks rearwardly and upwardly to horizontal against the sides of the stalk to remove foliage. It will be appreciated that such a proposal involves an undesirably large quantity of mechanical components occupying a relatively long span. Also, the use of horizontal rollers involves problems due to the need to align the vertical stalks with the feed path defined by such rollers. This can be particularly difficult since the stalks are usually oriented at various inclinations relative to vertical.

It is, therefore, an object of the present invention to minimize or obviate problems of the type discussed above.

Another object of the invention is to provide a novel cane harvester.

It is another object of the invention to enable sugarcane stalks to be mechanically harvested and defoliated in a rapid manner by a simplified mechanism.

It is a further object of the invention to enable sugarcane stalks to be harvested in either upright or inclined positions.

An additional object of the invention is to provide a novel stalk conveyor which removes residual trash.

Yet a further object of the invention is to provide a novel ground support mechanism.

SUMMARY OF THE INVENTION

These objects are achieved by the present invention which involves a harvester comprising a mobile frame on which is mounted a deflector for engaging and bending upper portions of standing stalks forwardly. A cutter cuts the bent stalks at their base. A pair of generally rotary stalk feeding members are disposed behind the deflector and are mounted for rotation about generally upright axes. These rotary feeding members form a generally upright nip therebetween for gripping the lower stalk ends and feeding the stalks rearwardly. A drive mechanism rotates the feeding members to feed the lower stalk ends rearwardly while upper ends thereof are acted upon by the deflector to cause the stalks to travel upwardly within the nip as the stalks travel rearwardly, thereby causing the stalks to approach a horizontal orientation.

Preferably, there are provided a plurality of pairs of stalk feeding rotary members which are inclined relative to vertical by progressively increasing amounts toward the rear so as to accelerate the reorientation of the stalks toward a horizontal inclination.

THE DRAWINGS

These objects and advantages of the invention will become apparent from the following detailed description of a preferred embodiment thereof, in connection with the accompanying drawings in which like numerals designate like elements, and in which:

FIG. 1 is a side elevational view of a sugarcane harvester according to the present invention with a portion of a billet conveyor broken away;

FIG. 2 is a rear view of the harvester passing along a row of cane;

FIG. 3 is a horizontal section through a front portion of the harvester during a harvesting operation;

FIG. 4 is a vertical section taken along line 4—4 in FIG. 3 through a front portion of the harvester during a harvesting operation;

FIG. 5 is a cross-sectional view through the billet conveyor taken along line 5—5 in FIG. 1;

FIG. 6 is a fragmentary plan view of detrashing screws in the billet conveyor;

FIG. 7 is a fragmentary side view of a ground support mechanism for the harvester;

FIG. 8 is a cross-sectional view of a foliage flail taken along line 8 in FIG. 3;

FIG. 9 is a schematic view of a cane stalk being defoliated as it passes along a flail;

FIG. 10 is a cross-sectional view of the ground support mechanism taken along line 10—10 in FIG. 7; and FIG. 11 is a plan view of an alternative stalk cutting mechanism for the harvester.

DETAILED DESCRIPTION OF A PREFERRED EMBODIMENT OF THE INVENTION

A stalk harvester 10 according to the present invention comprises a mobile frame 12 having a ground support preferably in the form of endless tracks 14 located on both sides of the frame 12.

While the harvester can be arranged to be pulled or pushed by another vehicle, it is preferably provided with its own power plant 17 (FIG. 2) so as to be self-propelled. An operator's station 18 is provided on the frame together with all necessary operating controls. As will become apparent, the exact nature of the framework, propulsion unit, and operator's station may assume various forms in accordance with the present invention.

Basically, a stalk handling portion of the harvester includes a deflecting station 20 (FIGS. 1 and 4) for bending upper ends of the stalks forwardly if they are not already so oriented, a cutting station 22 for severing stalks at their base, a conveying-defoliating station 24 wherein the cut stalks are (a) fed rearwardly, (b) oriented toward a generally horizontal position and (c) stripped of foliage, a chopping station 26 where the defoliated stalks are chopped into shorter billets, and a detrashing station 28 where trash, such as leaves, which has been carried along with the stalks is removed. At the end of the detrashing station, the billets are deposited into a collector, such as a trailing vehicle (not shown), for example.

The deflecting station 20 (FIGS. 1, 4) comprises a horizontal deflecting roll 30 located above and forwardly of the conveying-defoliating station 24. The deflecting roll 30 includes a resilient outer periphery and is freely rotatably mounted on a horizontal yoke 34, the latter being affixed to the rod end 36 of a fluid ram 38.

The ram 38 is mounted on an arm 40 which is rotatably mounted about a horizontal axis 41 on a pair of posts 42, 43 located at opposite sides of the frame 12. A pair of fluid actuated rams 44, 45 have their cylinder ends pivotably connected to the posts 42, 43 and their rod ends connected to the arm 40. Thus, by selectively extending and retracting the rams 38, 44, 45, the vertical and/or horizontal locations of the deflecting roll 30 can be adjusted.

A pair of horizontally-spaced rearwardly converging stalk gathering arms 46, 47 project forwardly from opposite ends of the yoke 34 to gather the stalks.

Thus, as the harvester traverses a row of stalks, the deflecting roll 30 contacts upper portions of the stalks and bends the stalks forwardly about their bases (FIG. 4).

The conveying-defoliating station 24 (FIGS. 1, 3, 4) includes a subframe 48 which is vertically adjustably mounted on the frame 12 by any suitable means. The subframe 48 includes laterally spaced side walls 50, 52 interconnected by an upper plate 54 and a plurality of lower cross-plates 56A-E which are spaced apart.

Rotatably mounted at a front end of the subframe 48 are a pair of primary feed rolls 60. Each feed roll 60 is mounted on a vertical axle 62 whose upper and lower ends are mounted in bearings in the upper plate 54 and a cross plate 56A. The feed rolls are spaced opposite one another to define a nip or pinch zone therebetween within which the stalks are gripped and conveyed.

Stalk cutters are situated adjacent the bottom of the feed rolls 60 to sever the stalks at their bases, as will be discussed hereinafter.

Each feed roll is preferably similar in construction to the horizontal feed rolls of a sugarcane separator described and illustrated in U.S. Pat. No. 3,976,498 issued to the present inventor on Aug. 24, 1976 (see the feed rolls designated by numerals 72, 72' in that patent). The disclosure of that patent is hereby incorporated by reference as if set forth at length herein. Basically, each feed roll is formed of a resilient material such as rubber and is provided with apertures 62 extending end-to-end therethrough in directions parallel to the rotary axis of the feed rolls. The outer peripheral surface of each feed roll includes axially spaced, circumferentially extending grooves within which are implanted radially projecting spikes 64. The presence of the apertures 62 and the circumferential grooves functions to increase the flexibility of the feed rolls to enable them to more fully conform to and envelop the peripheries' differently shaped stalks, thereby enhancing the control maintained over the stalks. Further control is effected by the spikes 64 which penetrate the stalks and impose positive drive forces thereon.

In lieu of roll-type rotary feeders, a pair of upright endless belts could be provided which rotate about vertical axes and form a nip therebetween for gripping and feeding the stalks along an extended horizontal distance.

Disposed behind the feed rolls 60 is a first defoliating mechanism 68 comprising a first defoliating rotor 70 and a first pressure roll 72, the latter being located opposite the first defoliating rotor 70 and on the other side of a stalk travel path. The first defoliating rotor and pressure roll 70, 72 form a nip therebetween aligned generally with and behind the nip formed by the feed rolls 60.

The first defoliating rotor and pressure roll 70, 72 are mounted on parallel, generally vertical axes 74, 76 which are rotatably supported in the upper plate 54 and a cross plate 56B. The axles 74, 76 are oriented at an acute angle (preferably about twelve degrees) relative to the vertical axles of the feed rolls 60, whereby upper ends of the first defoliating rotor and pressure roll 70, 72 are located ahead of lower ends thereof (i.e., the upper ends are advanced in the direction of travel of the harvester). Accordingly, the stalk travel path defined by the first defoliating mechanism 68 is inclined somewhat rearwardly and upwardly relative to that of the feed rolls 60. As will be explained, the arrangement of the rolls 70, 72 accelerates the reorienting of the stalks from a generally vertical to a generally horizontal posture.

The first defoliating rotor 70 includes longitudinally spaced groupss of outwardly projecting flails 80 formed of a resilient material. For example, the flails 80 may be formed of sections of conventional rubber V-belts (FIG. 8) of the type normally used to transmit power between pulleys. Thus, each flail has a trapezoidal cross-section including converging side surfaces 82 and long and short parallel end surfaces 84, 86. Each converging surface 82 forms a stalk-engaging edge 88 where it intersects the long end surface 84.

The first defoliating rotor and pressure roll 60, 72 are rotated in opposite directions wherein the rolls 70, 72 travel through the nip in the direction of stalk travel, i.e., rearwardly. The flails 80 are mounted so that the longer end surfaces 84 travel ahead of, i.e., lead, the shorter end surfaces 86. Thus, the edges 88 of the flails initially contact the stalks while traveling counter to the direction of leaf growth (i.e., the leaf stems extend forwardly). Rubbing action of the flails against the stalks, stems and leaves thus occurs whereby the flails strip the leaves L from the stalk (FIG. 9). The defoliating roll 70 is driven substantially faster than the feed rolls 60 and the pressure roll 72 to achieve this rubbing action. The leaves are shredded by the flails and fall onto the ground between the cross-plates 56. Openings in the side walls 50, 52 may also be provided at suitable locations to assist in the discharge of foliage.

The flails are mounted on a square cross-sectional hub portion 90 of the axle 74. Each flail is disposed with its shorter end surface 86 facing a side of the hub 90 and parallel thereto whereby the flails are oriented eccentrically (i.e., non-radially) relative to the rotary axis of the hub. The flails are arranged in circumferentially spaced, vertical groups, preferably four groups in number. The flails within each group are spaced from one another by means of spacers 92 (FIG. 8) which include converging faces 94 in engagement with the surfaces 82 of adjacent flails.

To retain the flails 80 in place, four vertical plates 96 are placed over each group of flails and against the long end surfaces 84 of the flails, and are secured thereagainst by screws 98 which attach to the hub 90.

The flails act against stalks as the latter are frictionally engaged by a resilient periphery 102 of the pressure roll 72. Preferably, the pressure roll is hollow, comprising a rubber cylindrical sleeve 103 mounted on axially spaced hub plates 104 (FIG. 3).

Preferably disposed behind the first defoliating rotor and pressure roll 70, 72 are a second defoliating rotor and pressure roll 70', 72', the latter defining a nip aligned with that of the first defoliating rotor and pressure roll but being reversely positioned relative to the latter (i.e., the second defoliating rotor 70' lies behind the first pressure roll 72), so that flails 80' of the second defoliating rotor act upon the stalks from the side opposite the first flails 80.

Actually, the stalks will tend to rotate slightly about their own longitudinal axes while being fed rearwardly through the defoliating nips, to assure that all portions of the stalk periphery are acted upon by the defoliating flails.

The second defoliating rotor and pressure roll 70', 72' are constructed in a manner similar to the first defoliating rotor and pressure roll 70, 72, respectively, so that no further detailed description thereof is needed.

The second defoliating rotor and pressure roll are mounted in the upper plate 54 and a cross plate 56C and are oriented at an acute angle, preferably about twelve degrees, relative to the axles 74, 76 of the first defoliating rotor and pressure roll 70, 72.

Disposed behind the second defoliating rotor and pressure roll 70', 72' are a pair of secondary feed rolls 105 defining a nip aligned with that of the second rotor and roll 70', 72'. These secondary feed rolls are constructed similar to the pressure rolls 72, 72' and are rotated in opposite directions to continue the feeding of the stalks rearwardly toward the chopping station 26.

The chopping station 26 comprises a pair of rotary chopper members 106 carrying a plurality of radially extending, generally vertically oriented blades 108. The chopper members 106 are rotated at a synchronized speed in the same direction as the feed rolls, so that the blades 108 are intermittently aligned with one another to chop a stalk passing therebetween.

As noted earlier, at the cutting station 22, the stalks are severed at their bases. In one embodiment of the invention, discs 110 are mounted to lower ends of the axles 62 of the primary feed rolls 60. A plurality of radially projecting cutter blades 112 are mounted on the discs 110 for rotation therewith. The discs 110 are disposed at different vertical levels in horizontal (radial) overlapping relationship with each other, and are rotated at synchronized speed (via the feed rolls 60) to assure that the blades 112 overlap one another at the nip of the rolls to cut the stalks by a scissors-like action.

Cutting of the stalks preferably occurs as the stalks are disposed in a forwardly bent condition produced, if necessary, by the deflection roll 30 (FIG. 4). Stalks which may be oriented rearwardly are initially contacted by the feed rolls before being cut. As the stalk is severed, the lower end of the stalk tends to spring upwardly and is gripped within the vertical nip of the feed rolls 60 (see stalk A in FIG. 4). At that moment, the stalk is likely disposed in an inclined position between the deflection roll 30 and the primary feed rolls 60. The feed rolls feed the lower ends of the stalks rearwardly, thereby increasing the degree of inclination of the stalks relative to vertical (see stalk B in FIG. 4), because the upper ends of the stalks are being acted upon by the deflection roll 30 (i.e., the deflection roll 30 tends to act as a fulcrum about which the stalks are swung toward a horizontal position). Thereafter, the lower or rear ends of the stalks are fed rearwardly by the first defoliating rotor and pressure roll 70, 72 (see stalk C in FIG. 4). As the stalk is so propelled, the upper or forward end thereof passes from contact with the deflection roll 30 and contacts a horizontal control roll 120 rotatably mounted between the side walls 50, 52. As the stalk continues to be propelled rearwardly, it is progressively reoriented toward a horizontal posture, with the control roll 120 acting as the "fulcrum" during the operation. The inclined nature of the rotors and rolls 60, 70, 72, 70', 72', 105 accelerates this reorienting action (i.e., the longitudinal travel path for the stalks defined by the rotors and rolls curves rearwardly and upwardly), because the directions of feeding forces applied to the stalks become directed progressively upwardly. Eventually, when the stalks leave the influence of the control roll 120, they lie substantially horizontally (see stalks E in FIG. 4).

An alternative stalk cutting mechanism may comprise a conventional transversely reciprocating sickle bar 113 disposed adjacent lower ends of the feed rolls as depicted in FIG. 11.

The reciprocating sickle bar 113 cooperates with a conventional stationary blade and is driven by a suitable reciprocating mechanism 115.

If desired, a pair of lower gathering arms 121 (FIG. 3) may be disposed on opposite sides of the row of cane stalks being traversed, to aid in gathering the stalks.

The rotors and rolls 60, 70, 72, 70', 72', 105, and the cutters 106 are individually rotated by means of conventional synchronously driven hydraulic motors 122 connected to the upper ends of the axles of those driven members. The primary and secondary feed rolls 60, 105, and the pressure rolls 72, 72' are all driven at a common speed, the defoliating rotors 70, 70' are driven at a substantially higher speed than the feed and pressure rolls to achieve proper defoliating of the stalks. The cutting rolls 108 are driven at a speed commensurate with the desired lengths of cut billets.

Billets which are discharged from the chopping station 26 fall onto the lower end of a billet conveyor 130 (FIGS. 1, 5, 6) at the detrashing station 28. The conveyor 130 includes a generally U-shaped trough 132 which includes a pair of side walls 133 that are mounted to the main frame 12 by means of a horizontal pivot (not shown) at the lower ends of the side walls 133. A pair of fluid rams 136 are pivotably connected between the side walls 133 and the frame 12 and serve to raise and lower the upper end of the trough 132 to adjust the degree of inclination of the trough.

Forming the floor of the trough are a plurality of detrashing screws 138 (FIGS. 5, 6). The ends of the detrashing screws 138 are mounted in upper and lower end walls 140 of the trough (only the upper wall 140 being depicted) which end walls interconnect the side walls 133. The lower end wall (not shown) substantially encloses the bottom end of the trough to prevent the escape of sugarcane billets which are introduced into the trough thereabove. The upper end wall 140 is of crescent shape (FIGS. 2, 5) and is disposed below the tops of the screws 138 so as not to obstruct the rearward discharge of billets from the trough.

Each screw includes a shank portion 144 and a helical screw thread portion 146 (FIG. 6). The pitch of the screw thread, i.e., the distance between longitudinally aligned points on the thread, is shorter than the length of billets being fed, to assure that the billets ride upon the screw threads as they are pushed upwardly by a feed screw 150. Tash, such as leaves and the like which are commingled with the billets fall between the screw threads and into a nip or pinch point 147 formed by adjacent thread and shank portions 142, 144. The screws 138 are driven in such manner that the screws rotate downwardly through alternate nips so as to pull the trash from the trough. Even leaves which may not have been fully severed from the billets can be torn therefrom by such action of the screws. At the other nips the screws travel upwardly and transfer trash to the next adjacent nip.

The screws may be driven by imparting rotary motion to one screw and transmitting that rotary motion to the other screws by means of intermeshing gears (not shown) mounted at adjacent ends of the screws.

Situated within the trough is the large helical feed screw 150. The feed screw 150 includes a center shank 152 and a helical flight 154 whose periphery extends across the upper ends of the screws 138, the latter being arranged to correspond to the screw periphery. The center shank 152 has its end mounted in bearings carried by the lower end wall (not shown) and a bracket 156 mounted to the upper ends of the trough side walls 133. The helical flight 154 contacts the ends of the billets and pushes them upwardly along the screw threads, whereupon they are discharged from the upper end of the trough. The location of the upper end of the trough can be varied to the type of billet receiving structure which is employed.

As noted earlier, the mobile frame 12 contains ground support tracks 14, each of which comprise a pair of metal endless belts 200 each extending from a front tire 202 to a rear tire 204 (FIGS. 1, 2, 7). As the belts travel adjacent the periphery of the tires (which may comprise standard air-filled rubber tires), they are disposed radially inwardly relative to the tire periphery or rim. A plurality of transverse traction members 208 formed of high strength metal are connected between the belts 200. The traction members are of U-shaped cross-section, including a base 210 and legs 212. The legs 212 are mutually parallel and project in outward directions away from the inner area bordered by the belts (e.g., the legs project radially outwardly when passing around the tires). The bases 210 of the channel members 208 are riveted to the belts 200. Center portions 214 of the channel members 208 are bent outwardly to form a recess for receiving the front and rear tires 202, 204. A beam 213 extends between the front and rear tires on each side of the frame 12. A plurality of auxiliary guide wheels 220 are mounted on the beam to maintain the channel members in driving engagement with the ground. Some or all of the tires are driven by the power plant 17. Rotation of the tires produces rotation of the tracks 14, whereby the legs 212 of the center portions 214 of the channel members dig into the ground to advance the harvester. Such center portions 214 also resist lateral slippage of the harvester, allowing the same to be employed on inclined ground.

It will be appreciated that the present invention provides a novel sugarcane harvester which effectively cuts, defoliates, and reorients the stalks despite the random directions in which the cane stalks tend to grow. The generally upright feeding and defoliating rollers present upright nips which do not require that the stalks be precisely oriented in a horizontal posture to be fed. Rather, the cane stalks may enter the nip at any level therein and travel vertically within the nip while passing therethrough. This greatly simplifies handling and facilitates reorientation of the stalks. The manner in which the feed and defoliating rolls become gradually more inclined relative to vertical tends to accelerate the reorientation of the stalks from vertical to horizontal.

The billet conveyor 130 effectively transfers stalk billets while the screws 146 thereof separate residual trash or foliage from the billets.

The novel design of the ground support tracks enables the harvester to transverse unfriendly terrain while employing conventional rubber tires. Also, the tendency for the harvester to slip laterally is resisted, thereby promoting use of the harvester on sloping ground surfaces.

Although the present invention has been described in connection with a preferred embodiment thereof, it will be appreciated by those skilled in the art, that substitutions, additions, deletions, and modifications not specifically described may be made without departing from the spirit or scope of the invention as defined in the appended claims.

What is claimed is:

1. Apparatus for harvesting stalks, comprising:
   mobile frame means,
   deflecting means mounted on said frame and extending transversely of the direction of travel of said frame for engaging and bending upper portions of the stalks forwardly,
   cutting means for cutting the bent stalks at their base,
   a first pair of generally upright rotary stalk feeding members disposed behind said deflecting means and mounted for rotation about generally upright axes, said rotary feeding members forming a generally upright nip therebetween, said nip disposed rearwardly of the location where said cutter means cuts the stalks for gripping the lower stalk ends and feeding the stalks rearwardly,
   drive means for rotating said feeding members to feed the lower ends of stalks rearwardly while upper ends thereof are acted upon by said deflecting means to cause the stalks to travel upwardly within the nip as the stalks travel rearwardly, thereby causing the stalks to approach a horizontal condition, and
   an additional pair of stalk-feeding rotary members disposed behind said first feeding members, said additional feeding members being mounted for rotation about axes inclined relative to vertical such that upper ends of the additional feeding members are disposed forwardly of lower ends thereof.

2. Apparatus according to claim 1, wherein said deflecting means is adjustable in elevation relative to said cutting means.

3. Apparatus according to claim 2, wherein said deflecting means is mounted on a vertically adjustable arm which also carries stalk gathering arms.

4. Apparatus according to claim 1, wherein said cutting means comprises a pair of rotary elements mounted for rotation about generally horizontally spaced vertically axes, said rotary elements including outwardly projecting blades which are vertically spaced and overlap horizontally to cut stalks by a scissors-like action.

5. Apparatus according to claim 4, wherein said rotary cutting elements are mounted at the bottom of said feeding members and rotatable coaxially therewith.

6. Apparatus according to claim 1 further including conveyor means disposed at a downstream end of said pairs of rotary members for receiving and transporting stalks therefrom, said conveyor means comprising:
- a plurality of pairs of longitudinally extending screws having shanks and intermeshing helical threads, the thread of each screw forming a nip with the shank of an adjacent screw,
  the pitch of said threads being smaller than the stalk lengths so that the stalks travel upon said threads above said nips,
- means driving said screws such that at least some of said nip-forming threads and shanks travel downwardly to pinch trash and pull it downwardly away from the stalks, and
- feeding means displaceable longitudinally above said screws to advance the stalks longitudinally.

7. Apparatus according to claim 6, wherein said screws are arranged to form a trough-like structure, said feeding means comprising a screw conveyor having a rotary axis disposed parallel to and equidistantly from said screws, and a helical conveyor flight extending substantially to said screws.

8. Apparatus according to claim 1, wherein front and rear tires are disposed on each side of said mobile frame, and an endless track mounted on each associated pair of front and rear tires, each track comprising a pair of endless track adapted to be wrapped around front and rear tires of mobile frame, and to be driven by rotation of at least one of said tires to advance the frame, said track comprising:
- a pair of endless belts extending from one tire to the other on opposite sides of said belts extending around said tires radially inwardly of the tire diameter, and
- a plurality of cross members interconnecting said belts and each including a pair of legs oriented in planes perpendicular to planes defined by said belts, said legs projecting away from the area bordered by said belts, said legs including central portions curved outwardly away from said area to extend around and conform to the tire diameter.

9. In a stalk-harvesting apparatus of the type comprising a mobile frame, means on said frame for deflecting upper ends of the stalks forwardly, means on said frame for cutting the stalks at their base, a plurality of pairs of rotary driven members located on said frame and behind said cutting means and defining generally aligned nips, and means for driving said rotary members to feed the cut stalks rearwardly and orient them toward a horizontal position, the improvement wherein:
- at least some of said pairs of rotary members have their rotary axes inclined relative to vertical, such that upper ends of such rotary members are disposed forwardly of lower ends thereof, the amount of inclination of said pairs progressively increasing in the rearward direction;
- at least one of said pairs of rotary members including a defoliating rotor having outward projections and an opposing pressure roll; and said drive means rotating said defoliating rotor and pressure roll through their nip in the direction of stalk travel and rotating said defoliating rotor faster than the speed of the stalks so that the projections travel relative to the stalks to strip foliage therefrom.

10. Apparatus according to claim 9, wherein said pairs of rotary members comprise a pair of opposed feed rolls located ahead of said one pair of rolls and rotatable about generally vertical axes, said feed rolls forming a nip for gripping and propelling cut stalks rearwardly to said one pair of rolls, said drive means rotating said feed rolls and said pressure roll slower than said defoliating rotor.

11. Apparatus according to claim 10, wherein said pairs of rotary members include a second defoliating rotor and a second pressure roll located behind said one pair, said second rotor and roll being positioned oppositely of said first pair relative to a direction of stalk travel.

12. Apparatus according to claim 9, wherein said pairs of rotary members include a pair of secondary feed rolls located behind said defoliating rotor and pressure roll and mounted for rotation about generally vertical axes.

13. Apparatus according to claim 12, including a stalk-cutting mechanism located behind said secondary feed rolls, said stalk-cutting mechanism comprising a pair of rolls rotatable about generally vertical axes and having radially projecting cutter blades.

14. Apparatus according to claim 11, wherein said rotary axes of said one pair of rotary members are inclined relative to vertical and said rotary axes of said second pair of defoliating rotor and pressure roll are inclined relative to vertical by an amount greater than said one pair.

15. Apparatus for harvesting sugarcane stalks comprising:
- frame means having ground support means for transversing rows of growing sugarcane stalks;
- cutter means on said frame means for cutting stalks at their base;
- first stalk feeding means comprising a pair of vertical rotary feed rolls forming a vertical nip therebetween for receiving cut stalks,
  each feed roll including a resilient outer periphery and a plurality of outwardly projecting spikes for piercing the stalks,
- deflecting means disposed forwardly of said feed rolls for bending upper portions of the stalks forwardly while they are being cut to cause lower ends of the stalks to spring upwardly into said nip upon the stalks being cut;
- first stalk defoliating means disposed behind said feed means, said first stalk defoliating means comprising a first rotary defoliating rotor and a first rotary pressure roll disposed opposite said first defoliating roll and forming a nip therewith generally aligned with the nip of said feed rolls,
  said first defoliating rotor and said first pressure roll being rotatable about parallel axes inclined relative to vertical, with upper ends of said first defoliating rotor and first pressure roll disposed forward relative to lower ends thereof,
  said first defoliating roll comprising a hub and a plurality of flails projecting outwardly therefrom, said first pressure roll including a resilient outer periphery;

second stalk defoliating meand disposed behind said first defoliating means, said second defoliating means comprising a second rotary defoliating rotor and a second rotary pressure roll disposed opposite said second defoliating rotor and forming a nip therewith generally aligned with the nip of said first defoliating means, said second defoliating rotor being disposed on the same side of the stalk travel path as said first pressure roll, and said second pressure roll being disposed on the same side of the stalk travel path as said first defoliating rotor, said second defoliating rotor and second pressure roll being rotatable about parallel axes inclined relative to vertical by an amount greater than the inclination of said first defoliating rotor and first pressure roll, with upper ends of said second defoliating rotor and second pressure roll disposed forwardly of lower ends thereof, said second defoliating rotor comprising a hub and a plurality of flails projecting outwardly therefrom, said second pressure roll including a resilient outer periphery;

second stalk feeding means disposed behind said second defoliating means and comprising a pair of second rotary feed rolls forming a nip therebetween generally aligned with said nip of said second defoliating means;

said second feed rolls including resilient outer peripheries and being rotatable about axes inclined relative to vertical by an amount greater than the inclination of said second defoliating means, with upper ends of said second feed rolls disposed forwardly of lower ends thereof;

stalk chopping means disposed behind said second feed means for cutting stalks cross-wise onto shorter billets; and drive means for rotating all of said rotary rotors and rolls in the direction of stalk travel therepast so that cut stalks are fed rearwardly while being progressively raised within said nips toward a horizontal orientation, said drive means rotating said first and second feed rolls and first and second pressure rolls slower than said first and second defoliating rotors such that said flails rub foliage from the stalks.

* * * * *